US012469867B2

(12) United States Patent
Ruf et al.

(10) Patent No.: US 12,469,867 B2
(45) Date of Patent: Nov. 11, 2025

(54) METHOD FOR REGULATING THE PLATINUM OXIDE FRACTION IN A FUEL CELL, AND FUEL CELL SYSTEM FOR A MOTOR VEHICLE

(71) Applicant: AUDI AG, Ingolstadt (DE)

(72) Inventors: Markus Ruf, Waldstetten (DE); Hannah Staub, Karlsdorf-Neuthard (DE)

(73) Assignee: AUDI AG, Ingolstadt (DE)

( * ) Notice: Subject to any disclaimer, the term of this patent is extended or adjusted under 35 U.S.C. 154(b) by 320 days.

(21) Appl. No.: 17/999,339

(22) PCT Filed: Oct. 4, 2021

(86) PCT No.: PCT/EP2021/077307
§ 371 (c)(1),
(2) Date: Nov. 18, 2022

(87) PCT Pub. No.: WO2022/073938
PCT Pub. Date: Apr. 14, 2022

(65) Prior Publication Data
US 2024/0243316 A1    Jul. 18, 2024

(30) Foreign Application Priority Data
Oct. 7, 2020    (DE) .................... 10 2020 126 191.8

(51) Int. Cl.
*H01M 8/04* (2016.01)
*H01M 8/04082* (2016.01)
(Continued)

(52) U.S. Cl.
CPC ... *H01M 8/04791* (2013.01); *H01M 8/04126* (2013.01); *H01M 8/04201* (2013.01);
(Continued)

(58) Field of Classification Search
CPC ......... H01M 8/04791; H01M 8/04126; H01M 8/04201; H01M 8/04305; H01M 8/044;
(Continued)

(56) References Cited

U.S. PATENT DOCUMENTS

2017/0012311 A1    1/2017 Oh et al.
2018/0175416 A1    6/2018 Kim et al.
(Continued)

FOREIGN PATENT DOCUMENTS

DE    10-2018-202084 A1    8/2019
JP    2008077884 A    4/2008
JP    2011192458 A    9/2011

OTHER PUBLICATIONS

International Search Report and Written Opinion, dated Feb. 2, 2022, for International Application No. PCT/EP2021/077307. (8 pages).
(Continued)

Primary Examiner — James M Erwin
(74) Attorney, Agent, or Firm — Seed Intellectual Property Law Group LLP

(57) ABSTRACT

A method is described for regulating the platinum oxide fraction in a catalyst layer of a fuel cell of a fuel cell stack for a motor vehicle, involving the steps: model-based determination of a present fraction of platinum oxide in dependence on a present operating state; determination of the electrical potential and/or a change in potential in dependence on the present fraction of platinum oxide; adapting the fraction of platinum oxide in dependence on an anticipated and/or demanded operating state of the fuel cell and/or of the vehicle.

13 Claims, 3 Drawing Sheets

(51) Int. Cl.
*H01M 8/04119* (2016.01)
*H01M 8/04298* (2016.01)
*H01M 8/0444* (2016.01)
*H01M 8/04537* (2016.01)
*H01M 8/04746* (2016.01)
*H01M 8/04791* (2016.01)
*H01M 8/04828* (2016.01)
*H01M 8/04858* (2016.01)
*H01M 8/043* (2016.01)

(52) U.S. Cl.
CPC ..... *H01M 8/04305* (2013.01); *H01M 8/0444* (2013.01); *H01M 8/04544* (2013.01); *H01M 8/04753* (2013.01); *H01M 8/04835* (2013.01); *H01M 8/04865* (2013.01); *H01M 8/04947* (2013.01); *H01M 8/043* (2016.02); *H01M 2250/20* (2013.01)

(58) Field of Classification Search
CPC ......... H01M 8/04544; H01M 8/04753; H01M 8/04835; H01M 8/04947; H01M 8/043; H01M 2250/20
USPC .......................................................... 429/400
See application file for complete search history.

(56) References Cited

U.S. PATENT DOCUMENTS

2018/0316027 A1 11/2018 Arisetty et al.
2018/0358638 A1* 12/2018 Mielke ............. H01M 8/04303

OTHER PUBLICATIONS

Office Action, dated Aug. 30, 2021, for German Patent Application No. 102020126191.8. (4 pages).

* cited by examiner

METHOD FOR REGULATING THE PLATINUM OXIDE FRACTION IN A FUEL CELL, AND FUEL CELL SYSTEM FOR A MOTOR VEHICLE

BACKGROUND

Technical Field

Embodiments of the invention relate to a method for regulating the platinum oxide fraction in a catalyst layer of a fuel cell of a fuel cell stack for a motor vehicle as well as a fuel cell system for a motor vehicle.

Description of the Related Art

When a fuel cell system is used in a motor vehicle, depending on the operating state of the motor vehicle during its operation, especially during its driving, platinum oxide builds up and influences the potential of the fuel cell stack. In order to comply with aging criteria in a fuel cell stack, it is desirable to remain below a limit potential in the operation of the fuel cell system or the motor vehicle. However, it has been found that the current potential depends greatly on the parameter of the platinum oxide fraction.

If there is a high fraction of platinum oxide in the fuel cells in a fuel cell system in combination with high moisture content in the membrane, an increased and in particular an accelerated aging of the fuel cells will occur, due to platinum dissolving or platinum washout. When the fraction of platinum oxide is low, very high power may be produced, which leads to challenges in drive train management, for example in certain kinds of operation of the motor vehicle, such as stop-and-go traffic, because the high power of the fuel cell system has to be stored or put out in suitable manner to electrical consumers. These issues are briefly explained here with the aid of the diagram in FIG. 6. The diagram shows schematically the voltage plotted against the current density in the case of high platinum oxide fraction (solid line) and in the case of low platinum oxide fraction (dotted line). If one compares the current density for constant voltage U, it is evident that the current density is greater in the case of low platinum oxide fraction. Accordingly, a higher (minimum) power P2 of the fuel cell (the product of voltage times current) results in the case of low platinum oxide fraction for the same (cell) voltage, as compared to the (minimum) power P1 in the case of a high platinum oxide fraction.

BRIEF SUMMARY

Some embodiments include a method with which an optimized operation of a fuel cell system is made possible, so that a premature aging can be avoided.

Thus, a method is proposed for regulating the platinum oxide fraction in a catalyst layer of a fuel cell of a fuel cell stack for a motor vehicle, involving the steps:
- model-based determination of a present fraction of platinum oxide in dependence on a present operating state;
- determination of the electrical potential and/or a change in potential in dependence on the present fraction of platinum oxide;
- adapting the fraction of platinum oxide in dependence on an anticipated and/or demanded operating state of the fuel cell and/or of the vehicle.

Thanks to such a method, the current fraction of platinum oxide is calculated in ongoing manner by means of a model and its influence on the potential in the fuel cell is determined. Additional factors or parameters, such as partial pressures of gases like hydrogen which are supplied to the fuel cell, the aging condition of the fuel cell, contamination of the fuel cell, can further be considered in the method.

In the method, the fraction of platinum oxide can be reduced by discharging the fuel cell of the fuel cell stack down to a potential which is less than or equal to 0.5 Volt, especially during starting or stopping phases of the fuel cell.

The fraction of platinum oxide can be reduced by adapting the quantity of air supplied at the cathode side, so that the potential is reduced in the fuel cell or in the fuel cell stack.

The fraction of platinum oxide can also be reduced by increasing the power put out by the fuel cell or the fuel cell stack, so that the potential is reduced in the fuel cell or in the fuel cell stack. In this case, a battery can be charged by means of the power put out by the fuel cell or the fuel cells.

In the method, the fraction of platinum oxide can be increased or at least maintained by reduction of the power put out by the fuel cell or the fuel cell stack while at the same time increasing the power put out by a battery. In this way, for example, operating points or operating situations in which platinum oxide is reduced can be avoided. The required power is buffered by means of the battery or removed from the battery, so that the operating state of the fuel cell can be optimized in regard to the fraction of platinum oxide.

The fraction of platinum oxide can also be increased by creating a negative load jump, wherein at first a higher power is temporarily set, which lies below a power of a reference operation of the fuel cell, and then a target power is set, whereby the load jump so created achieves a lower minimum power than in the reference operation. The method of active platinum oxide regulation means that platinum oxide is deliberately not broken down during at the initially higher power as compared to the reference operation. Therefore, during a subsequent negative load jump, a much lower minimum power can be achieved as compared to the reference operation, so that the fraction of platinum oxide can be increased.

The relative humidity of the air supplied at the cathode side can be reduced upon finding a high fraction of platinum oxide. In this way, the degradation or aging of the fuel cell can be counteracted, in particular a platinum dissolving or platinum washout can be prevented by means of the reduced humidity.

The adjusting, especially the reducing or increasing, of the fraction of platinum oxide can be determined in dependence on an ongoing determined potential gradient and/or an ongoing determined efficiency gradient. The adapting can be determined in dependence on a portion of time during which a particular potential is present. In this way, a discrete time regulation can be achieved, taking into account the fact that the fraction of platinum oxide changes at a particular potential, and this in dependence on how long this potential value is present.

There is also proposed a fuel cell system for a motor vehicle, having a fuel cell generating a potential, wherein the fuel cell comprises an anode fluidically connected to an anode circuit, a cathode fluidically connected to a cathode supply, an ionically conductive membrane separating the cathode from the anode, and a catalyst layer of platinum oxide. Moreover, the fuel cell system comprises a controller which is adapted to carry out the above described method.

In such a fuel cell system, the cathode supply can comprise an air supply line having a humidifier and a humidifier bypass around the humidifier. At least one valve mechanism can be arranged in the air supply line and/or in the humidifier bypass in order to control the flow through the humidifier bypass. This structural layout with humidifier bypass enables a targeted control or regulation of the humidity of the air flow supplied at the cathode side to the fuel cell.

A motor vehicle, especially an electrically powered motor vehicle, can be outfitted with a fuel cell system as described above.

BRIEF DESCRIPTION OF THE SEVERAL VIEWS OF THE DRAWINGS

Further benefits and details will emerge from the following description of embodiments making reference to the figures.

DETAILED DESCRIPTION

Figure 1:
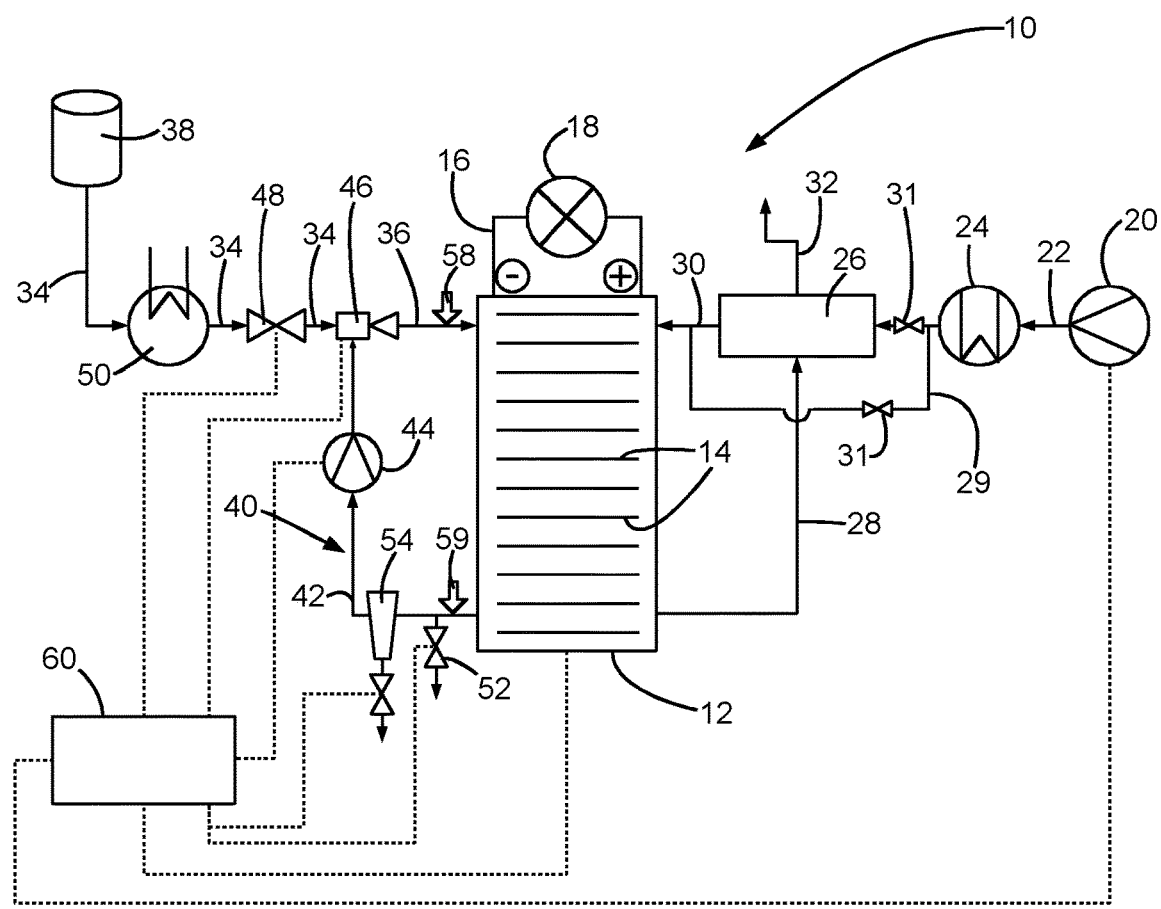
FIG. 1 shows a fuel cell system having a humidifier bypass.

FIG. 1 shows a fuel cell system 10 in schematic and simplified manner. The fuel cell system 10 comprises a fuel cell stack 12, having multiple fuel cells 14 connected in a row. The fuel cells 14 each have an anode and a cathode, the anode and the cathode being separated from each other by a proton-conducting membrane. The membrane can be formed from an ionomer, such as a sulfonated tetrafluorethylene polymer (PTFE) or a polymer of perfluorinated sulfonic acid (PFSA). Alternatively, the membrane can also be configured as a sulfonated hydrocarbon membrane.

A catalyst can be mixed in with the anodes and/or the cathodes of the fuel cells 14. The membranes can be provided or coated on their first and/or on their second side with a catalyst layer. As the catalyst, one may consider for example precious metals, such as platinum, palladium, ruthenium and the like, or mixtures with these precious metals. The catalysts serve as accelerators in the reaction of the particular fuel cell 14.

Through anode spaces within the fuel cell stack 12, an anode gas or fuel (such as hydrogen) is supplied to the anodes. In a polymer electrolyte membrane fuel cell (PEM fuel cell), fuel or fuel molecules are split up into protons and electrons at the anode. The membrane lets the protons pass through, but it is impermeable to the electrons. Oxidation or a surrender of electrons occurs at the anode. While the protons pass through the membrane to the cathode, the electrons are taken by an external circuit 16 to the cathode or to an electrical consumer 18. Through cathode spaces within the fuel cell stack 12, cathode gas (such as oxygen or air containing oxygen) can be supplied to the cathode, so that reduction or uptake of electrons occurs at the cathode side. The electrical consumer 18 can be a storage for example, such as a high-voltage battery of a motor vehicle, or an electric motor or some other appliance operated by means of electric energy, especially a vehicle component.

A compressor 20 is arranged at the air or cathode side, which draws in and compresses ambient air, for example. Due to the compression, the temperature or the air drawn in or the cathode gas is increased. Therefore, the cathode gas is first taken by a compressor line 22 to an intercooler 24, in order to cool it down once more to the desired temperature. Leaving the intercooler 24, the cathode gas drawn in and compressed is taken to a humidifier 26. In the humidifier 26, the dry cathode gas is mixed with the moisture of the cathode exhaust gases, which is supplied by a cathode exhaust gas line 28 to the humidifier 26, and thus humidified. By a cathode supply line 30, the humidified cathode gas is supplied to the cathode spaces of the fuel cell stack 12. Furthermore, the humidifier 26 is connected to an exhaust gas line 32, by which the remaining cathode exhaust gas is taken out from the fuel cell system 10.

Upstream from the humidifier 28, a humidifier bypass 29 branches off. The humidifier bypass 29 once more joins the cathode supply line 30, downstream from the humidifier 28. Upstream from the humidifier 28 or in the humidifier bypass 29 there can be provided or arranged a valve mechanism 31, in order to adjust the at least partial flow through the humidifier bypass 29. Even though FIG. 1 shows two valve mechanisms 31, simply as an example, it is clear that a single valve mechanism 31 can also be sufficient. Thus, the valve mechanisms 31 shown in FIG. 1 can be provided alternatively, but also additionally. The at least one valve mechanism 31 or a single valve mechanism should be arranged so that both the mass flow of air can be taken entirely through the humidifier 28 or entirely through the humidifier bypass. Of course, the valve mechanism 31 can also be provided such that it can be set at an intermediate position, so that a partial mass flow of air is taken respectively through the humidifier 28 and the humidifier bypass 29.

The anode spaces of the fuel cell stack 12 are connected at the stack entry side by an anode supply line 34, 36 to a fuel reservoir 38 providing the anode gas or the fuel. The fuel cell system 10 has an anode circuit 40, in which fuel unreacted at the anodes or unreacted anode exhaust gas can be supplied once more to the anode spaces by an anode recirculation line 42 at the exit from the stack. For this, the anode recirculation line 42 is connected to the anode supply line 34, so that one part 36 of the anode supply line 34 forms the anode circuit 40 together with the anode recirculation line 42.

The anode recirculation line 42 has a recirculation blower 44, which is incorporated in the anode recirculation line 42, especially in terms of fluid mechanics. In the region of a connecting node of the anode supply line 34 and the anode recirculation line 42, a jet pump or an ejector 46 is situated, which supports the circulation of the mixture formed from anode exhaust gas and fresh anode gas or fuel. A fuel adjusting valve mechanism 48 is arranged in the anode supply line 34, especially upstream from the ejector 46, to regulate the supply of fresh fuel or anode gas. This fuel valve mechanism 48 may be configured as a pressure regulating valve. Upstream from the pressure regulating valve 48 there is arranged a heat exchanger 50, for example in the form of a recuperator, for conditioning of the fuel or anode gas.

The anode recirculation line 42 is connected to a purge valve 52, in order to put out the gas mixture present in the anode circuit 40 to the surroundings or to a dilutor (not shown). Moreover, a liquid separator 54, especially a water separator, can be arranged in the anode recirculation line 42. At the stack entry side there can be arranged a sensor device 58, especially a pressure/temperature sensor. Moreover, at the stack exit side there can be arranged a sensor device 59, especially a pressure/temperature sensor.

The fuel cell system 10 moreover comprises a controller 60, which stands in a communication connection with various components of the fuel cell system 10, as indicated by the broken lines. The controller 60 in the present example is also designed in particular to detect the potential generated by a fuel cell 14 or the fuel cell stack 12. Moreover, the controller 60 can be adapted to detect the pressure and/or temperature values at the sensor devices 58, 59 or to obtain them from these. The communication links between the controller 60 and the sensor devices 58, 59 are not shown for reasons of clarity, even when they are present. Moreover, a usually present communication line to the at least one valve mechanism 31 for actuating or regulating the flow of air through the humidifier 28 and/or the humidifier bypass 29 is not shown.

Figure 2:
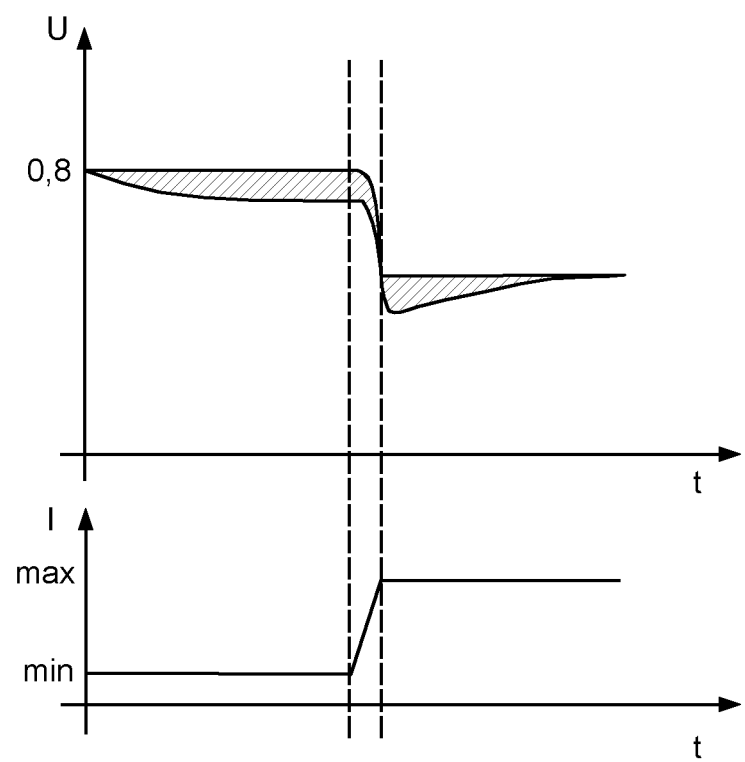
FIG. 2 shows a diagram showing qualitatively the relationship between current and voltage as well as the build-up and break-down of platinum oxide in a fuel cell.

FIG. 2 shows curves for the potential U and current I of a fuel cell plotted against time t in a simplified representation. It is evident from the diagram that a build-up of platinum oxide +PtOx in the catalyst layer of a fuel cell occurs at high potentials in the range of around 0.8 V. If the potential drops to a value below 0.8 V, say in the range of 0.4 to 0.6V, a break-down of platinum oxide −PtOx occurs in the catalyst layer. In other words, platinum oxide is built up when the power of the fuel cell is low (at high voltage), i.e., also in particular in phases of a minimum power operation of the fuel cell. Platinum oxide is diminished or reduced when the power of the fuel cell is high (at low voltage), i.e., also in particular in phases of full load.

The behavior shown in FIG. 2 for the build-up and break-down of platinum oxide in the catalyst layer can serve as the basis, for example, for the procedure of regulating the platinum oxide fraction during the operation of the fuel cell.

Figure 3:
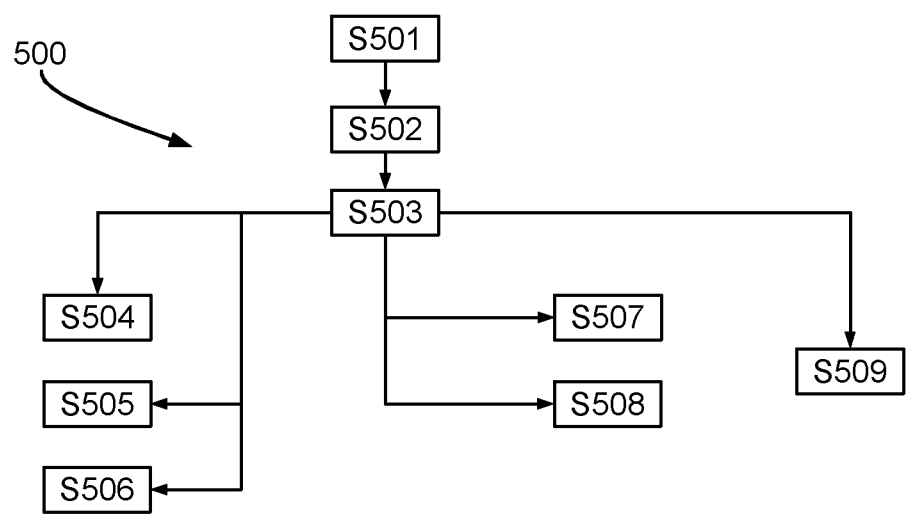
FIG. 3 shows a simplified diagram to illustrate the method for regulating the platinum oxide fraction in a catalyst layer of a fuel cell.

FIG. 3 shows in simplified and schematic manner certain steps of a method 500 for regulating the platinum oxide fraction, the adapting of the fraction of platinum oxide being done in dependence on an anticipated and/or demanded operating state of the fuel cell and/or the vehicle. In the method 500, there occurs in step S501 a model-based determination of a present fraction of platinum oxide in dependence on a present operating state. In step S502 there occurs a determination of the electrical potential and/or a change in potential in dependence on the present fraction of platinum oxide. In step S503, finally, there occurs the adapting of the fraction of platinum oxide in dependence on an anticipated and/or demanded operating state of the fuel cell and/or of the vehicle.

In the method 500, according to a step S504, the fraction of platinum oxide can be reduced by discharging the fuel cell of the fuel cell stack down to a potential which is less than or equal to 0.5 Volt, especially during starting or stopping phases of the fuel cell.

The fraction of platinum oxide can alternatively or additionally be reduced by adapting the quantity of air supplied at the cathode side, so that the potential is reduced in the fuel cell or in the fuel cell stack, as illustrated by step S505.

In the method 500 according to step S506, alternatively or additionally, the fraction of platinum oxide can be reduced by increasing the power put out by the fuel cell or the fuel cell stack, so that the potential is reduced or decreased in the fuel cell or in the fuel cell stack. According to step S506, a battery can be charged by means of the power put out by the fuel cell or the fuel cells.

According to step S507, the fraction of platinum oxide can be increased or at least maintained by reduction of the power put out by the fuel cell or the fuel cell stack while at the same time increasing the power put out by a battery. In this case, more energy or power will be taken out of the battery temporarily than that which is provided by the fuel cell for the battery. Thus, the battery serves as a kind of energy or current buffer, and it is desirable or intended that the battery be temporarily more heavily loaded for an improved operation of the fuel cell in regard to the regulating of the fraction of platinum oxide in the catalyst layer.

Alternatively or additionally, the fraction of platinum oxide can be increased by creating a negative load jump, wherein a higher power is temporarily set, which lies below a power of a reference operation of the fuel cell, and then a target power is set, whereby the load jump so created achieves a lower minimum power than in the reference operation, as illustrated by step S508. This kind of regulation of the platinum oxide fraction can be used in particular during the starting of the fuel cell system.

Figure 4:
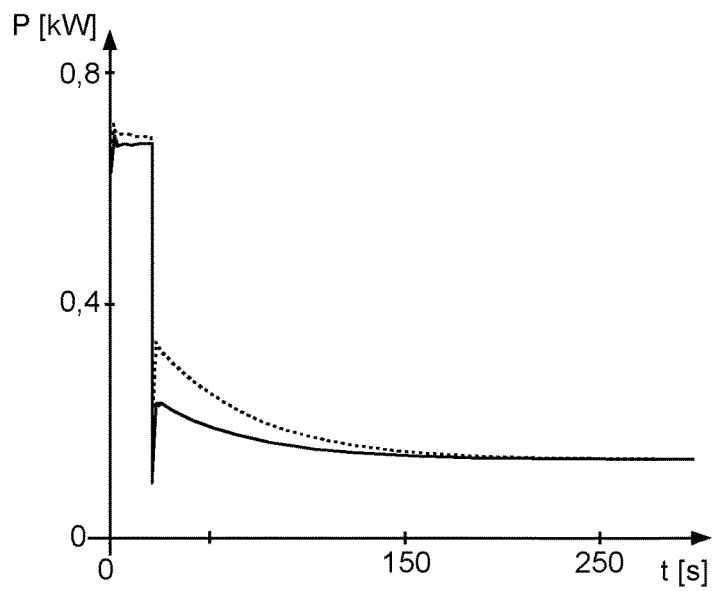
FIG. 4 shows a diagram showing qualitatively the power as a function of time during a negative load jump.

The method step employed in step S508 is illustrated in FIG. 4 in a simplified diagram of the power P plotted against the time t. In the diagram, the line shown dotted corresponds to a reference operation of a fuel cell or a fuel cell stack. The solid line represents the power curve when the described method 500 for model-based regulation of the platinum oxide fraction is used. It is evident from the diagram that, upon first starting of the fuel cell or the fuel cell system, especially during the first 20 seconds or so of operation, the power is maintained somewhat lower, thereby deliberately breaking down less platinum oxide. During the following negative load jump, a significantly reduced minimum power can be achieved for a longer time as compared to the reference operation. The power curves for the operation with regulated platinum oxide fraction (solid line) and the reference operation (dotted line) become equal after around 150 to 200 seconds or so. Thus, an optimized operation is possible, especially in a starting phase of a fuel cell or a fuel cell system or a vehicle, during which advantageous states for the fuel cell in regard to a possible minimum power can also be achieved by taking into account and regulating the platinum oxide fraction.

According to a step S509 the relative humidity of the air supplied at the cathode side can be reduced upon finding a high fraction of platinum oxide. In this case, the above described humidifier bypass 29 (FIG. 1) or the at least one associated valve mechanism 31 can be appropriately activated by the controller 60, so that air is supplied at the cathode side to the fuel cell, at least partly bypassing the humidifier 28. In this way, the less humid air reaches the fuel cell, counteracting the wash-out of platinum oxide and thus a worsening or aging of the fuel cell.

Figure 5:
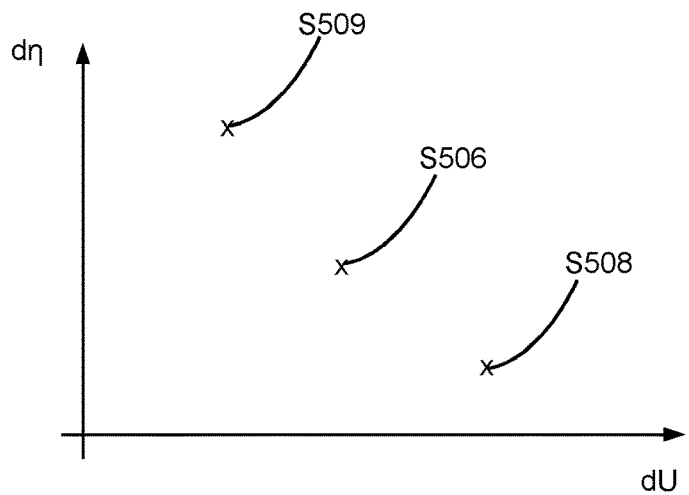
FIG. 5 shows a diagram showing qualitatively the relationship between the potential gradient and the efficiency gradient, with the measures to be derived from this.
Figure 6:
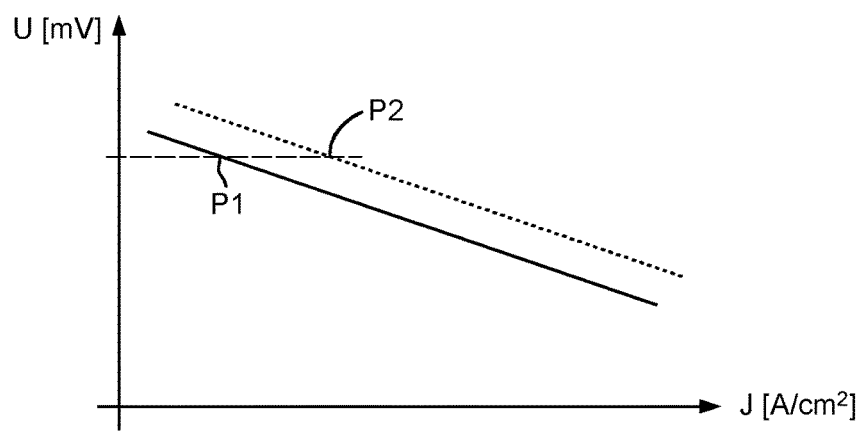
FIG. 6 shows a diagram showing qualitatively and schematically the relationship between cell potential and current density for different platinum oxide fractions.

In the method 500, the adjusting, especially the reducing or increasing, of the fraction of platinum oxide, according to one of the steps S503 to S509 described above for example, can be determined in dependence on an ongoing determined potential gradient and/or an ongoing determined efficiency gradient. For this, refer to the diagram of FIG. 5, which shows in simplified and schematic manner the potential gradient dU at which certain measures will be selected for regulating the platinum oxide fraction.

For example, a large potential gradient dU accompanies a specific starting process of the fuel cell, especially a negative load jump, as was described above with reference to process step S508 and FIG. 4. This can be for example a deliberate discharging of the fuel cell stack at a suitable moment in time, the cell potential being reduced for example by 30 mV, which decreases the fuel cell efficiency by 2%, for example.

At a medium potential gradient, for example, the power of the fuel cell can be raised and put out to the battery, as was explained in regard to step S506. The shifting of the load point can bring about, for example, a reduction of the cell potential by 20 mV, and the fuel cell efficiency can be reduced by 4%, for example.

At a low potential gradient dU, the intake of air at the cathode side, and especially also the humidity of the air, can be influenced, as was described with reference to step S509. For example, by changing, especially decreasing the amount of air supplied, one can achieve a reduction of the cell potential by 10 mV, for example, while the fuel cell efficiency is reduced by 1%, for example.

In the method 500, especially when taking account of the potential gradient, the adjusting can be determined in dependence on a portion of time during which a particular potential is present. This ensures that the platinum oxide fraction developing during the maintaining of a potential during a given period of time, especially a lengthy period, is also taken into account.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for regulating a platinum oxide fraction in a catalyst layer of a fuel cell of a fuel cell stack for a motor vehicle, comprising:
    model-based determination of a present fraction of platinum oxide in dependence on a present operating state;
    determination of an electrical potential and/or a change in potential in dependence on the present fraction of platinum oxide; and
    adapting the fraction of platinum oxide in dependence on an anticipated and/or demanded operating state of the fuel cell and/or of the vehicle,
    wherein the fraction of platinum oxide is increased or at least maintained by reduction of the power put out by the fuel cell or the fuel cell stack while at the same time increasing the power put out by a battery.

2. The method according to claim 1, wherein the fraction of platinum oxide is reduced by discharging the fuel cell of the fuel cell stack down to a potential which is less than or equal to 0.5 Volt, including during starting or stopping phases of the fuel cell.

3. A method for regulating a platinum oxide fraction in a catalyst layer of a fuel cell of a fuel cell stack for a motor vehicle, comprising:
    model-based determination of a present fraction of platinum oxide in dependence on a present operating state;
    determination of an electrical potential and/or a change in potential in dependence on the present fraction of platinum oxide; and
    adapting the fraction of platinum oxide in dependence on an anticipated and/or demanded operating state of the fuel cell and/or of the vehicle,
    wherein the fraction of platinum oxide is reduced by adapting the quantity of air supplied at the cathode side, so that the potential is reduced in the fuel cell or in the fuel cell stack.

4. The method according to claim 1, wherein the fraction of platinum oxide is reduced by increasing the power put out by the fuel cell or the fuel cell stack, so that the potential is reduced in the fuel cell or in the fuel cell stack.

5. The method according to claim 4, wherein a battery is charged by the power put out by the fuel cell or the fuel cell stack.

6. A method for regulating a platinum oxide fraction in a catalyst layer of a fuel cell of a fuel cell stack for a motor vehicle, comprising:
    model-based determination of a present fraction of platinum oxide in dependence on a present operating state;
    determination of an electrical potential and/or a change in potential in dependence on the present fraction of platinum oxide; and
    adapting the fraction of platinum oxide in dependence on an anticipated and/or demanded operating state of the fuel cell and/or of the vehicle,
    wherein the fraction of platinum oxide is increased by creating a negative load jump, wherein at first a higher power is temporarily set, which lies below a power of a reference operation of the fuel cell, and then a target power is set, whereby the load jump so created achieves a lower minimum power than in the reference operation.

7. A method for regulating a platinum oxide fraction in a catalyst layer of a fuel cell of a fuel cell stack for a motor vehicle, comprising:
    model-based determination of a present fraction of platinum oxide in dependence on a present operating state;
    determination of an electrical potential and/or a change in potential in dependence on the present fraction of platinum oxide; and
    adapting the fraction of platinum oxide in dependence on an anticipated and/or demanded operating state of the fuel cell and/or of the vehicle,
    wherein the relative humidity of the air supplied at the cathode side is reduced upon finding a high fraction of platinum oxide.

8. The method according to claim 1, wherein the adjusting; of the fraction of platinum oxide is determined in dependence on an ongoing determined potential gradient and/or an ongoing determined efficiency gradient.

9. The method according to claim 8, wherein the adjusting is determined in dependence on a portion of time during which a particular potential is present.

10. A fuel cell system for a motor vehicle, comprising:
    a fuel cell generating a potential, wherein the fuel cell comprises an anode fluidically connected to an anode circuit, a cathode fluidically connected to a cathode supply, an ionically conductive membrane separating the cathode from the anode, and a catalyst layer of platinum oxide; and
    a controller, which is adapted to carry out a method for regulating a platinum oxide fraction in the catalyst layer of the fuel cell, the method comprising:
    model-based determination of a present fraction of platinum oxide in dependence on a present operating state;
    determination of an electrical potential and/or a change in potential in dependence on the present fraction of platinum oxide; and
    adapting the fraction of platinum oxide in dependence on an anticipated and/or demanded operating state of the fuel cell and/or of the vehicle,
    wherein the fraction of platinum oxide is increased or at least maintained by reduction of the power put out by the fuel cell or the fuel cell stack while at the same time increasing the power put out by a battery.

11. The fuel cell system according to claim 10, wherein the cathode supply comprises an air supply line having a humidifier and a humidifier bypass around the humidifier.

12. The fuel cell system according to claim 11, wherein at least one valve mechanism is arranged in the air supply line and/or in the humidifier bypass in order to control the flow through the humidifier bypass.

13. A fuel cell system for a motor vehicle, comprising:
- a fuel cell generating a potential, wherein the fuel cell comprises an anode fluidically connected to an anode circuit, a cathode fluidically connected to a cathode supply, an ionically conductive membrane separating the cathode from the anode, and a catalyst layer of platinum oxide; and
- a controller, which is adapted to carry out a method for regulating a platinum oxide fraction in the catalyst layer of the fuel cell, the method comprising:
- model-based determination of a present fraction of platinum oxide in dependence on a present operating state;
- determination of an electrical potential and/or a change in potential in dependence on the present fraction of platinum oxide; and
- adapting the fraction of platinum oxide in dependence on an anticipated and/or demanded operating state of the fuel cell and/or of the vehicle,
- wherein the fraction of platinum oxide is increased by creating a negative load jump, wherein at first a higher power is temporarily set, which lies below a power of a reference operation of the fuel cell, and then a target power is set, whereby the load jump so created achieves a lower minimum power than in the reference operation.

* * * * *